W. V. TURNER.
STRAIGHT AIR EMERGENCY VALVE DEVICE.
APPLICATION FILED SEPT. 28, 1918.
1,311,930.
Patented Aug. 5, 1919.
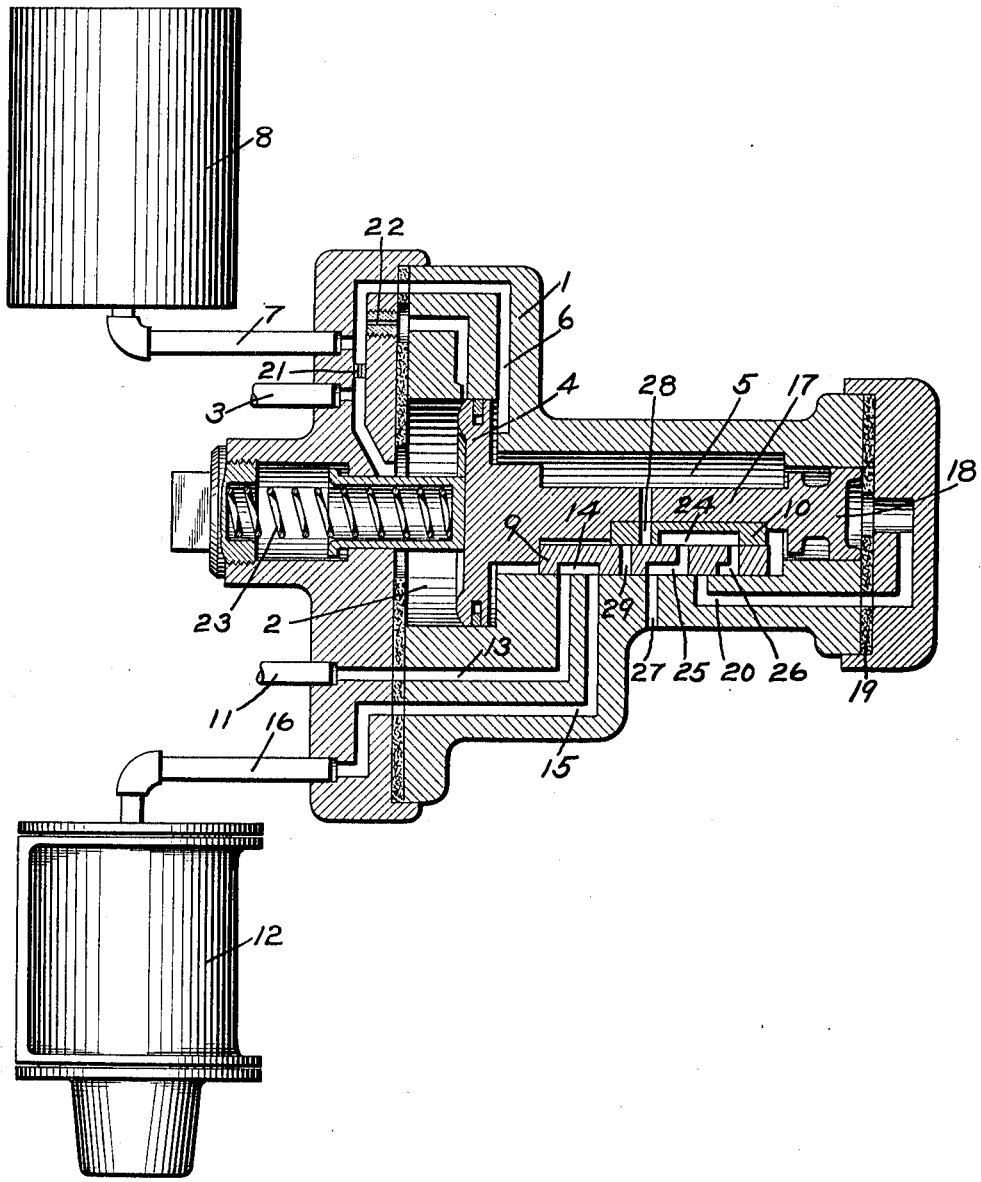
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

STRAIGHT-AIR EMERGENCY-VALVE DEVICE.

1,311,930. Specification of Letters Patent. Patented Aug. 5, 1919.

Application filed September 28, 1918. Serial No. 255,995.

*To all whom it may concern:*

Be it known that I, WALTER V. TURNER, a citizen of the United States, residing at Wilkinsburg, in the county of Allegheny and State of Pennsylvania, have invented new and useful Improvements in Straight-Air Emergency-Valve Devices, of which the following is a specification.

This invention relates to fluid pressure brakes, and more particularly to an emergency valve device normally adapted to permit the supply and release of fluid under pressure to and from the brake cylinder by straight air, but adapted to be operated upon a sudden reduction in brake pipe pressure for effecting an emergency application of the brakes.

According to my prior Patent No. 1,012,759, dated December 26, 1911, in order to normally maintain the valve parts of the emergency valve device in release position, and to insure the full movement of the parts to release position, after an emergency application of the brakes, a differential piston head is provided, which is subject on one face to atmospheric pressure, so that there is always a differential fluid pressure acting on the valve parts tending to return and to maintain the parts in the normal release position.

A possible objection to this construction is that leakage may occur past this differential piston when the parts are in emergency application position and even in release position.

The principal object of my present invention is to provide means for avoiding the above difficulty.

In the accompanying drawing, the single figure is a sectional view of an emergency valve device embodying my improvement.

As shown in the drawing, the emergency valve device may comprise a casing 1, having a piston chamber 2, connected to an emergency brake pipe 3 and containing piston 4. The valve chamber 5 at the opposite side of the piston 4 is connected by passage 6 and pipe 7 to main reservoir 8 and contains a main slide valve 9 and an auxiliary slide valve 10, mounted on the main slide valve and having a movement relative thereto.

A straight air pipe 11 is normally connected to the brake cylinder 12 through passage 13, cavity 14 in the main slide valve 9, passage 15, and pipe 16.

At the outer end of the piston stem 17 of the main piston 4 is provided a differential piston head 18, adapted in the release position of the parts to seat on a gasket 19 and having its outer face connected to a passage 20, leading to the seat of slide valve 4.

In operation, the valve chamber 5 is charged with fluid under pressure from the main reservoir 8 and the brake pipe 3 and the piston chamber 2 are also charged from the main reservoir through the restricted ports 21 and 22 and fluid pressures on opposite sides of the piston 4 being equal, the spring 23 maintains the valve parts in normal release position, as shown in the drawing.

In this position, the brakes can be applied and released by supplying and releasing fluid to and from the straight air pipe 11, as will be evident.

It will be noted that in release position of the parts, the passage 20 is blanked, so that no leakage can occur past the differential piston 18.

If a sudden reduction in pressure in the emergency brake pipe 3 is made, the fluid pressure in valve chamber 5 will shift the piston 4 to emergency position, and on the initial movement of the piston, the auxiliary slide valve 10 is first moved to cut off communication through cavity 24 from port 25 to port 26 in slide valve 9. Further movement of piston 4 operates the main slide valve so that the ports 25 and 26 are brought into registry with the respective passages 27 and 20, but since the cavity 24 has previously cut off communication between the ports 25 and 26, it will be seen that upon movement of the valve parts to emergency position, the passage 20 will still be blanked, so that leakage cannot occur past the piston 18.

In emergency position, port 28 in auxiliary valve 10 registers with port 29 in slide valve 9, while port 29 registers with passage 15, so that fluid is supplied from valve chamber 5 and main reservoir 8 to the brake cylinder 12, to effect an emergency application of the brakes.

When the emergency brake pipe pressure is increased to effect the release of the brakes, after an emergency application, the spring 23, together with the increased pressure in piston chamber 2, first moves piston 4 so that the auxiliary valve 10 connects the ports 25 and 26 through cavity 24, and since said ports register with the passages 27 and 20 in the emergency position of slide valve 9, the outer face of the differential piston 18 is subjected to atmospheric pressure, so that the unbalanced fluid pressure acting on the area of piston 18, operates to effect the quick and positive movement of the valve parts to release position.

Having now described my invention, what I claim as new, and desire to secure by Letters Patent, is:—

1. In a fluid pressure brake, the combination with a brake pipe, of an emergency valve device comprising a main piston subject to the opposing pressures of the brake pipe and a valve chamber, valve means operated by said piston for effecting an emergency application of the brakes, and a differential piston adapted to be connected to the atmosphere upon initial movement of the main piston from emergency application position.

2. In a fluid pressure brake, the combination with a brake pipe, of an emergency valve device comprising valve means for effecting an emergency application of the brakes, a main piston subject to brake pipe pressure and a differential piston for operating said valve means, one side of said differential piston being connected to the atmosphere upon the initial movement of said valve means from emergency application position.

3. In a fluid pressure brake, the combination with a brake pipe, of an emergency valve device comprising a main valve for effecting an emergency application of the brakes, a main piston operated upon a reduction in brake pipe pressure for operating said valve, a differential piston associated with the main piston, and an auxiliary valve having a movement relative to the main valve and operated upon the initial movement of the main piston from emergency position for connecting one side of said differential piston to the atmosphere.

4. In a fluid pressure brake, the combination with a brake pipe, of an emergency valve device comprising a main valve, an auxiliary valve having a movement relative to the main valve, a main piston for operating said valves, and a differential piston associated with the main piston and having a passage connected to one side which is held closed in the release position of said valves and in applying the brakes, and is adapted to be connected to the atmosphere upon the initial movement of the auxiliary valve from emergency position by the main piston.

In testimony whereof I have hereunto set my hand.

WALTER V. TURNER.

Copies of this patent may be obtained for five cents each, by addressing the "Commissioner of Patents, Washington, D. C."